US009700911B2

(12) United States Patent
Nakano (10) Patent No.: US 9,700,911 B2
(45) Date of Patent: Jul. 11, 2017

(54) DIE LIP DRIVING STRUCTURE

(71) Applicant: Sumitomo Heavy Industries Modern, Ltd., Yokohama (JP)

(72) Inventor: Katsuyuki Nakano, Yokohama (JP)

(73) Assignee: Sumitomo Heavy Industries Modern, Ltd., Yokohama (JP)

( * ) Notice: Subject to any disclaimer, the term of this patent is extended or adjusted under 35 U.S.C. 154(b) by 0 days.

(21) Appl. No.: 14/811,691

(22) Filed: Jul. 28, 2015

(65) Prior Publication Data

US 2016/0038964 A1 Feb. 11, 2016

(30) Foreign Application Priority Data

Aug. 5, 2014 (JP) ................................. 2014-159643

(51) Int. Cl.
  *B29C 47/16* (2006.01)
  *B05C 5/02* (2006.01)
  (Continued)

(52) U.S. Cl.
  CPC .......... *B05C 5/0254* (2013.01); *B29C 47/165* (2013.01); *B29C 47/18* (2013.01);
  (Continued)

(58) Field of Classification Search
  CPC ............ B29C 47/0019; B29C 47/0021; B29C 47/165
  See application file for complete search history.

(56) References Cited

U.S. PATENT DOCUMENTS 6,017,207 A * 1/2000 Druschel ............ B29C 47/0021
  425/141
6,663,375 B1 * 12/2003 Ulcej ................. B29C 47/0021
  425/141
(Continued)

FOREIGN PATENT DOCUMENTS

DE 3731961 A1 4/1989
JP H05-286015 A 11/1993
(Continued)

OTHER PUBLICATIONS

Extended Search Report issued in European Application No. 15178406.3, dated Feb. 9, 2016.
(Continued)

*Primary Examiner* — Yogendra Gupta
*Assistant Examiner* — Joseph Leyson
(74) *Attorney, Agent, or Firm* — Michael Best & Friedrich LLP (57) ABSTRACT

Provided is a die lip driving structure for adjusting a gap between a first lip and a second lip by applying a pressing load or a tensile load to a flexible lip portion which forms at least one of the first lip and the second lip provided in a die body, the die lip driving structure including: a lever supported by a rotating shaft as a fulcrum; and an operating rod which is supported to be displaced in an axial direction by the die body. A rotational force of the lever is converted into a force in the axial direction of the operating rod, and the force in the axial direction becomes a pressing load or a tensile load exerted on the flexible lip portion. The lever directly applies a force to the operating rod at the point of action of the lever.

6 Claims, 8 Drawing Sheets

(51) Int. Cl.
*B29C 47/18* (2006.01)
*B29C 47/92* (2006.01)
B29C 47/00 (2006.01)
B29C 47/08 (2006.01)

(52) U.S. Cl.
CPC .......... *B29C 47/92* (2013.01); *B29C 47/0019* (2013.01); *B29C 47/0021* (2013.01); *B29C 47/085* (2013.01); *B29C 2947/92152* (2013.01); *B29C 2947/92628* (2013.01); *B29C 2947/92647* (2013.01)

(56) References Cited

U.S. PATENT DOCUMENTS

| | | |
|---|---|---|
| 8,491,296 B2 | 7/2013 | Nakano |
| 8,506,280 B1 | 8/2013 | Pitsch et al. |
| 2012/0024226 A1 | 2/2012 | Nakano |

FOREIGN PATENT DOCUMENTS

| | | |
|---|---|---|
| JP | H11-277602 A | 10/1999 |
| JP | 2001-293767 A | 10/2001 |
| JP | 2009-247344 A | 10/2009 |
| JP | 2009-247345 A | 10/2009 |
| JP | 2010-247343 A | 11/2010 |
| JP | 2010-247344 A | 11/2010 |
| JP | 2010-247345 A | 11/2010 |
| TW | 201040013 A | 11/2010 |

OTHER PUBLICATIONS

Office Action issued in Taiwan Patent Application No. 104121149, dated Jan. 9, 2017.

\* cited by examiner

DIE LIP DRIVING STRUCTURE

RELATED APPLICATIONS

Priority is claimed to Japanese Patent Application No. 2014-159643, filed Aug. 5, 2014, the entire content of which is incorporated herein by reference.

BACKGROUND

Technical Field

Certain embodiments of the invention relate to the structure of a die lip driving unit.

Description of Related Art

In a lamination process for coating a base material such as a film, paper, or foil with a resin, a system which controls the thickness of the coating is known. In such a system, in order to control the flow rate of a molten resin which passes through an extruder, for example, a T-die is used. The T-die stores the molten resin in an internal manifold and distributes the molten resin in the width direction thereof such that the molten resin is derived into a sheet shape from the gap between a pair of lips provided at the tip end of the T-die.

The flow rate of the molten resin derived from the T-die is controlled by adjusting the size of the gap between the lips. Specifically, one of the pair of lips is referred to as a fixed lip, and the other is referred to as a flexible lip portion. The flexible lip portion is elastically deformed by driving an actuator such that the gap therebetween is adjusted.

In a configuration in the related art, a lever mechanism is disposed on the side surface of a die body, one end portion of the lever is connected to the flexible lip portion, and the other end portion is connected to the actuator. By driving the actuator and rotating the lever, the flexible lip portion is elastically deformed. In the lever mechanism, the driving force of the actuator is amplified by the principle of levers and is transmitted to the flexible lip portion. Therefore, control can be performed with good efficiency.

SUMMARY

According to an embodiment of the present invention, there is provided a die lip driving structure for adjusting a gap between a first lip and a second lip by applying a pressing load or a tensile load to a flexible lip portion which forms at least one of the first lip and the second lip provided in a die body. The die lip driving structure includes: a lever supported by a rotating shaft as a fulcrum, a position of the rotating shaft with respect to the die body being fixed; and an operating rod which is supported to be displaced in an axial direction by the die body and is supported by a point of action of the lever.

DETAILED DESCRIPTION

In the configuration in the related art, since the lever is installed on the side surface of the die body, the direction of a force exerted onto the flexible lip portion and the direction of the rotational force of the lever are not coincident with each other, and the rotational force cannot be used at the maximum. Therefore, there is room for improvement.

It is desirable to, in a die lip driving structure that adjusts the gap between lips by using a lever mechanism, more efficiently apply a driving force for adjusting the gap.

A rotational force of the lever is converted into a force in the axial direction of the operating rod, and the force in the axial direction becomes a pressing load or a tensile load exerted on the flexible lip portion. The lever directly applies a force to the operating rod at the point of action of the lever.

Hereinafter, embodiments of the invention will be described with reference to the drawings. In the following description, for convenience, positional relationships such as up and down may be expressed on the basis of the illustrated states.

One Embodiment

This embodiment is embodied by applying a die lip driving structure of the embodiment of the invention to a T-die of a laminator. The T-die temporarily stores a molten resin which passes through an extruder, in an internal manifold, and thereafter distributes the molten resin in the width direction thereof such that the molten resin is derived from the gap between a pair of lips and is formed into a sheet shape.

Figure 1:
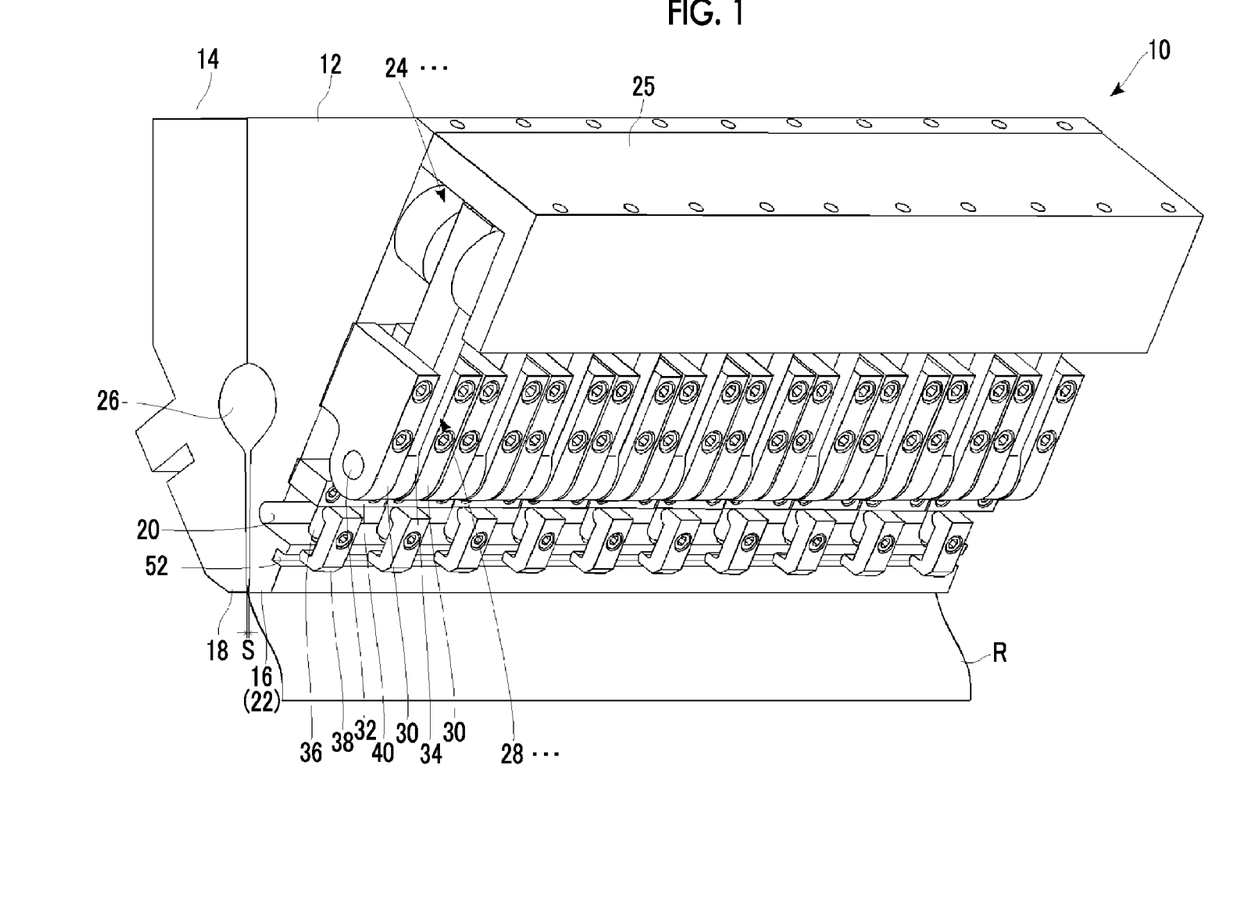
FIG. 1 is a perspective view of a T-die to which a die lip driving structure according to an embodiment is applied.

FIG. 1 is a perspective view of the T-die to which the die lip driving structure according to the embodiment is applied. A T-die 10 is configured by assembling a die body 12 and die body 14 to each other. A movable lip 16 is provided at the lower end of the die body 12, and a fixed lip 18 is provided at the lower end of the die body 14. The lips 16 and 18 extend in the width directions of the die bodies 12 and 14 and are arranged to oppose each other, thereby constituting a pair of lips (a first lip and a second lip) for adjusting the thickness of a resin coating film.

A concave cutout 20 is provided in the vicinity of the lower end of the die body 12 along the width direction thereof, and a flexible lip portion 22 which is elastically deformable is formed with the cutout 20 as the boundary. The flexible lip portion 22 forms the movable lip 16. By driving (deforming) the flexible lip portion 22, the gap between the movable lip 16 and the fixed lip 18 can be adjusted. The flexible lip portion 22 is driven by an actuator 24 attached to the die body 12.

A manifold 26 is formed between the die body 12 and the die body 14. A molten resin which is sent from an extruder (not illustrated) is retained once in the manifold 26 and is distributed in the width direction (the longitudinal direction in the figure). As the molten resin passes through the gap S between the fixed lip 18 and the flexible lip portion 22, a resin film R having a thickness corresponding to the size of the gap S therebetween is formed. As the resin, for example, various types of resins such as polyethylene (PE), polypropylene (PP), polyethylene terephthalate (PET), or polybutylene terephthalate (PBT) may be considered as molding objects.

The die body 12 is provided with a plurality of driving mechanisms 28 along the width direction thereof and the actuators 24 for driving the driving mechanisms 28. The actuators 24 are supported by a housing 25 having an L-shaped section, which is fixed along the side surface of the die body 12. The actuators 24 can individually deform the flexible lip portions 22 so that the gap S in each region can be adjusted.

Figure 2:
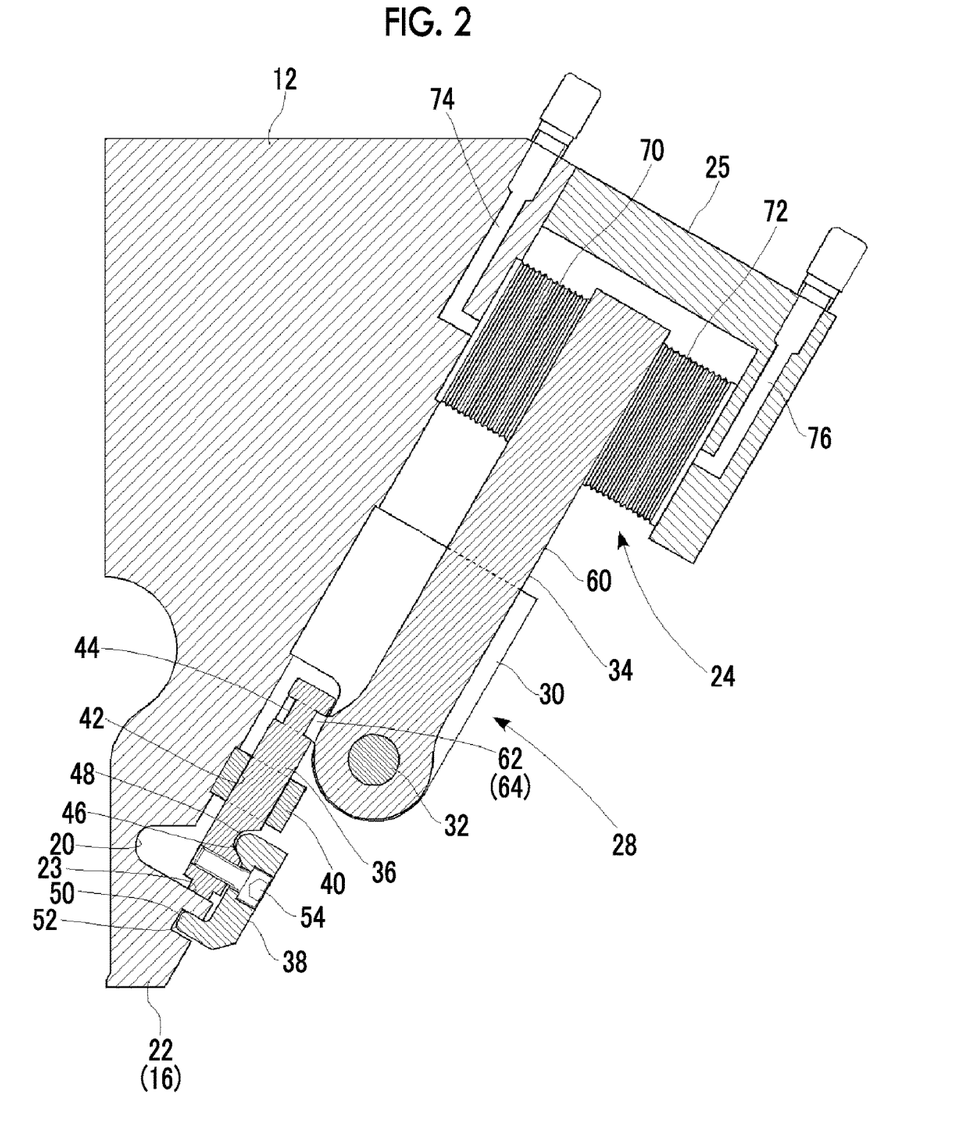
FIG. 2 is an enlarged sectional view illustrating the configuration of a die lip driving unit.
Figure 3:
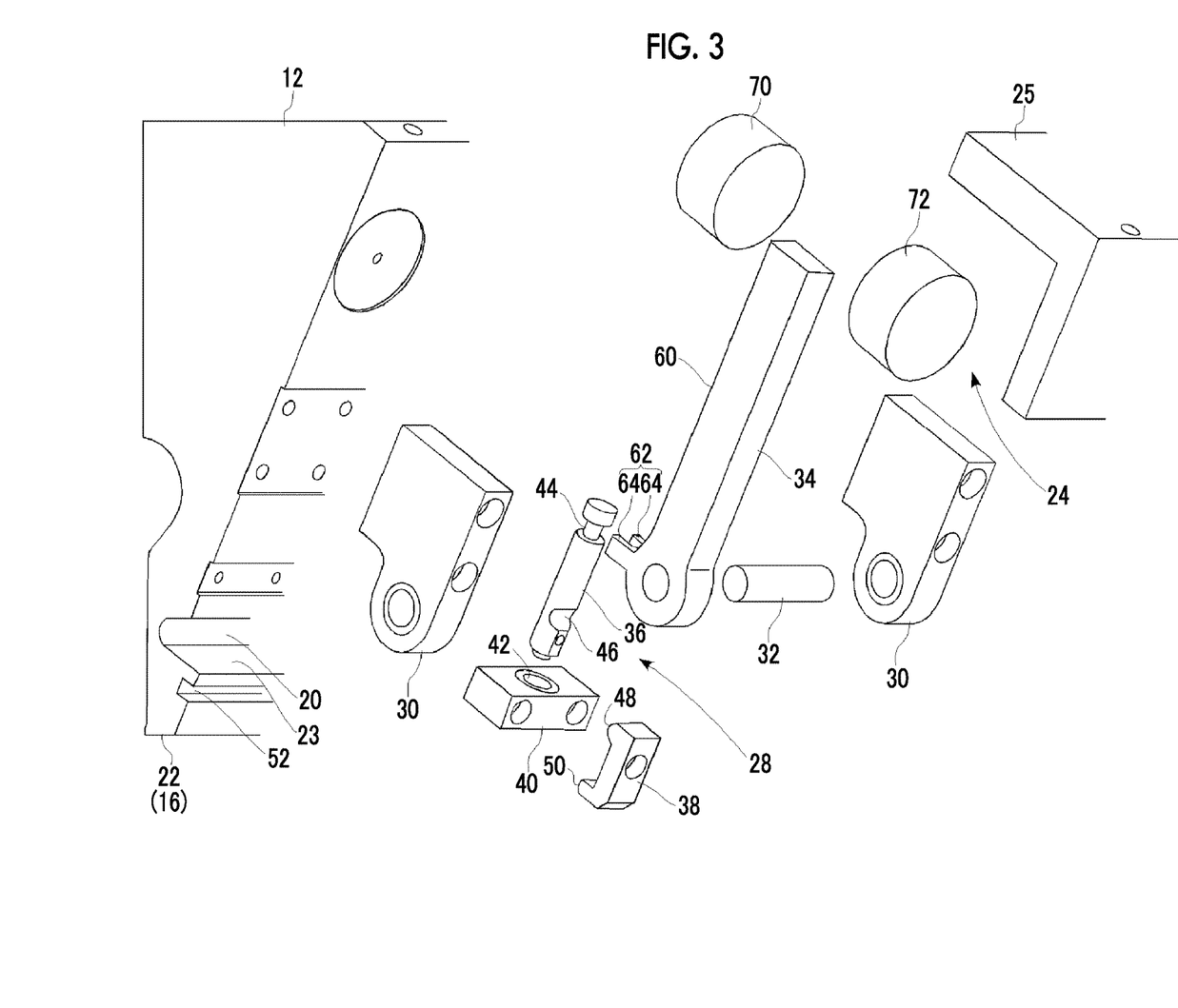
FIG. 3 is an exploded perspective view illustrating the constituent components of the die lip driving unit.

FIG. 2 is an enlarged sectional view illustrating the configuration of a die lip driving unit. FIG. 3 is an exploded perspective view illustrating the constituent components of the die lip driving unit. As illustrated in FIG. 2, the driving mechanism 28 is formed as a lever mechanism that amplifies the driving force of the actuator 24 and drives the flexible lip portion 22.

As illustrated in FIG. 3, the driving mechanism 28 is configured to include a pair of support members 30 which are attached to the side surface of the die body 12, a rotating shaft 32 which is horizontally fixed by the pair of support members 30, a lever 34 which is rotatably supported by the rotating shaft 32 as the fulcrum, an operating rod 36 which is operated in the axial direction thereof by receiving the rotational force of the lever 34, and a connection member 38 which connects the operating rod 36 to the flexible lip portion 22 in the axial direction. The operating rod 36 is supported to be oscillated in the axial direction by a bearing member 40 which is attached to the side surface of the die body 12.

The pair of support members 30 form a flat plate shape and are fastened to the die body 12 so as to be parallel to each other, and a space is provided between the two to interpose the lever 34 therebetween. The bearing member 40 has a rectangular parallelepiped shape, and is fastened to the die body 12 on the lower side of the support member 30. A through-hole 42 is formed to penetrate through the bearing member 40. The inner peripheral surface of the through-hole 42 forms a so-called slide bearing (oilless type bearing) and supports the operating rod 36 to be oscillated.

The operating rod 36 forms a stepped cylinder shape, and the intermediate portion thereof is inserted into the through-hole 42 of the bearing member 40. The upper portion of the operating rod 36 is provided with a narrowed portion 44 and forms a connection portion with the lever 34. The lower portion of the operating rod 36 is provided with a concave engagement portion 46 and forms a connection portion to the connection member 38. The flexible lip portion 22 is provided with a pressure-receiving surface 23 which opposes the tip end surface of the operating rod 36 at the position of the cutout 20.

The connection member 38 has a fork-shape in a longitudinal sectional view, and engagement portions 48 and 50 protrude from the upper and lower portion of the surface of the connection member 38 which opposes the die body 12. The engagement portion 48 has a shape substantially complementary to the engagement portion 46 of the operating rod 36. The engagement portion 50 has a shape substantially complementary to an engagement groove 52 which extends in the flexible lip portion 22 in the width direction thereof.

As illustrated in FIG. 2, the operating rod 36 and the connection member 38 are screwed to each other so that the engagement portion 48 is engaged with the engagement portion 46 and the engagement portion 50 is engaged with the engagement groove 52. The opposing surfaces of the engagement portions 46 and 48 are formed as tapered surfaces. Accordingly, the tip end surface of the operating rod 36 is pressed against the pressure-receiving surface 23 of the flexible lip portion 22 as a screw 54 is fastened, so that the operating rod 36 and the flexible lip portion 22 are firmly fixed to each other. A portion of the flexible lip portion 22 is nipped between the engagement portion 50 of the connection member 38 and the tip end portion of the operating rod 36, and accordingly, the operating rod 36 is connected to the flexible lip portion 22 in the axial direction thereof.

The lever 34 has a long plate-shaped body 60 which extends substantially in parallel to the side surface of the die body 12, and one end portion thereof is rotatably supported by the rotating shaft 32. The body 60 is provided to be substantially parallel to the operating rod 36 when the lever 34 is in a non-operated state. In addition, a fork-shaped connection portion 62 is provided to extend from one end portion of the body 60 in a direction at right angles with respect to the axis of the body 60. That is, the connection portion 62 has a pair of connection pieces 64 and is configured so that the gap therebetween is slightly greater than the outer diameter of the narrowed portion 44 of the operating rod 36 and the width thereof is slightly smaller than the length of the narrowed portion 44. In this configuration, as the connection portion 62 is fitted to the narrowed portion 44, the lever 34 and the operating rod 36 are connected to each other. In addition, the configuration is not limited to this embodiment as long as the rotational force of the lever 34 is directly applied to the operating rod 36. For example, the connection portion 62 may be configured not to extend in the direction at right angles with respect to the axis of the body 60. The axis of the body 60 and the extension direction of the connection portion 62 may form an acute angle or may also form an obtuse angle. In addition, the body 60 and the operating rod 36 may not be parallel to each other when the lever 34 is in the non-operated state.

The actuator 24 is of a pneumatic drive type and includes a pair of bellows 70 and 72 which are operated as compressed air is supplied or discharged. The bellows 70 is disposed on the die body 12 side with respect to the lever 34, and the bellows 72 is disposed on the opposite side to the die body 12 with respect to the lever 34. That is, the upper end portion of the lever 34 which acts as the point of application is supported to be nipped between the bellows 70 and the bellows 72. As the compressed air is supplied to one of the bellows 70 and 72, the lever 34 is rotated clockwise or counterclockwise in the figure.

Specifically, when the bellows 70 extends as the compressed air is supplied, the lever 34 is rotated clockwise in the figure, and the rotational force thereof is converted into an upward force in the axial direction of the operating rod 36. As a result, a tensile load is applied to the flexible lip portion 22 and thus the flexible lip portion 22 is changed in a direction in which the gap between the lips is increased. On the other hand, when the bellows 72 extends as the compressed air is supplied, the lever 34 is rotated counterclockwise in the figure, and the rotational force thereof is converted into a downward force in the axial direction of the operating rod 36. As a result, a pressing load is applied to the flexible lip portion 22 and thus the flexible lip portion 22 is changed in a direction in which the gap between the lips is reduced.

In order to realize the pneumatic drive mechanism, an air supply circuit which connects an air supply source (not illustrated) to the bellows 70 and 72 is provided. In the die body 12, an air supply path 74 which allows the air supply circuit and the bellows 70 to communicate with each other is formed, and in the housing 25, an air supply path 76 which allows the air supply circuit and the bellows 72 to communicate with each other is formed.

In addition, although not illustrated, a pressure regulating valve and a switching valve are provided between the air supply source and the air supply paths 74 and 76 from the upstream side. The pressure regulating valve adjusts the pressure of the compressed air supplied from the air supply source to the bellows 70 and 72. The switching valve switches between the bellows 70 and 72 to supply the pressure-adjusted compressed air thereto. That is, by switching between the paths in the air supply circuit, the air supply source is connected to one of the air supply paths 74 and 76, and the other is opened to the air. Accordingly, the bellows to which the compressed air is supplied extends, while the bellows which is opened to the air is reduced.

Figure 4A:
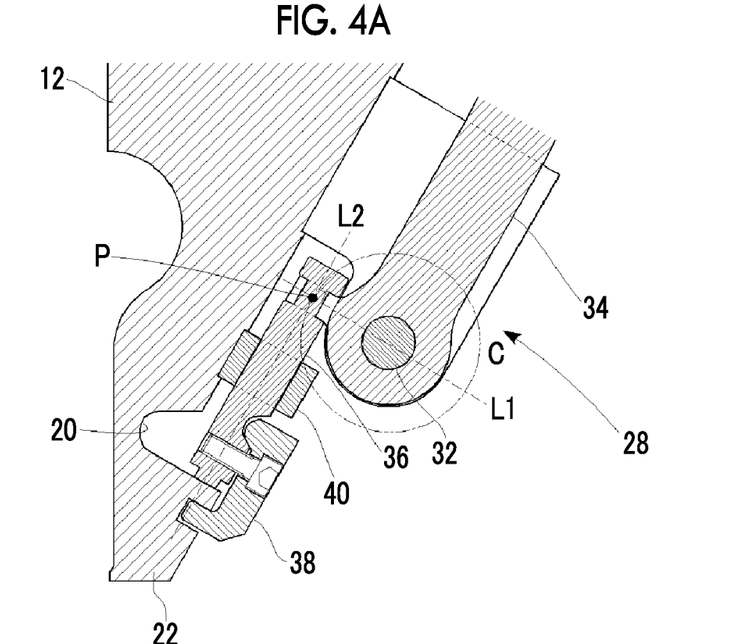
FIGS. 4A and 4B are explanatory views illustrating driving force transmission configurations of the die lip driving structure.
Figure 4B:
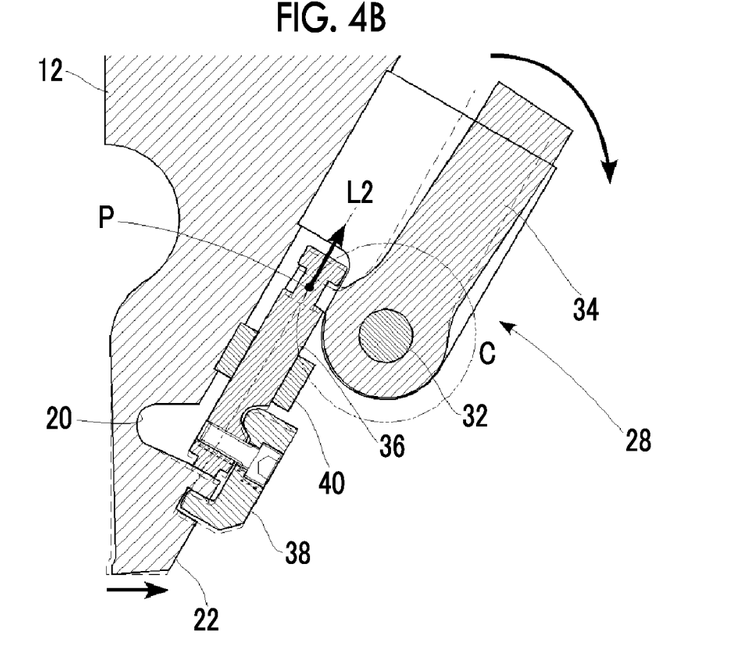

Next, operational effects of the die lip driving structure of this embodiment will be described. FIGS. 4A and 4B are explanatory views illustrating driving force transmission configurations of the die lip driving structure. FIG. 4A illustrates a neutral state of the die lip driving unit (both the bellows 70 and 72 are in a non-operated state), and FIG. 4B illustrates an expanding state of the die lip driving unit (only the bellows 70 is in an operated state).

According to this embodiment, the rotational force of the lever 34 is directly applied to the operating rod 36 at a point of action P. That is, the rotational force of the lever 34 is applied to the flexible lip portion 22 as a force in the axial direction of the operating rod 36. At this time, since the operating rod 36 is stably supported by the die body 12, the force in the axial direction thereof is efficiently transmitted to the flexible lip portion 22. As a result, the driving force for adjusting the gap between the lips 16 and 18 can be efficiently applied.

In this embodiment, as illustrated in FIG. 4A, a straight line L1 which connects the connection point of the lever 34 and the operating rod 36 (the point of action P of the lever 34) to the rotating shaft 32 (the fulcrum of the lever 34) is perpendicular to an axis L2 of the operating rod 36. Accordingly, the direction of the tangent of a virtual circle C that passes through the point of action P about the rotating shaft 32 as the center is coincident with the axial direction of the operating rod 36.

Therefore, as illustrated in FIG. 4B, the direction of the rotational force of the lever 34 at the point of action P is coincident with the axial direction of the operating rod 36. As a result, the rotational force of the lever 34 becomes the driving force of the operating rod 36 in the axial direction thereof as it is, and thus the force transmission efficiency can be maximized. That is, it is possible to extremely efficiently apply the driving force of the actuator 24 during the expanding operation of the flexible lip portion 22 (see the thick arrows in the figure).

Although not illustrated, even in a state where the die lip driving unit performs a narrowing operation (a state in which only the bellows 72 is operated), by simply reversing the direction of the force in FIG. 4B, the direction of the rotational force of the lever 34 at the point of action P becomes coincident with the axial direction of the operating rod 36. As a result, as in the expanding operation, the rotational force of the lever 34 becomes the driving force of the operating rod 36 in the axial direction thereof as it is, and thus the force transmission efficiency can be maximized. That is, according to this embodiment, it is possible to efficiently apply the driving force for adjusting the gap between the lips.

In addition, the configuration is not limited to this embodiment as long as the rotational force of the lever 34 is directly applied to the operating rod 36. For example, a configuration may also be employed in which the extension direction of the connection portion 62 (a direction that connects the rotating shaft 32 to the point of action P) and the axial direction of the operating rod 36 form an acute angle or an obtuse angle, and as a result, the direction of the rotational force of the lever 34 at the point of action P (for convenience, also referred to as a "rotational force application direction") and the axial direction of the operating rod 36 (for convenience, also referred to as a "axial force application direction") are not coincident with each other. In this case, while the body 60 and the operating rod 36 are parallel to each other, the axis of the body 60 and the extension direction of the connection portion 62 may form an acute angle or an obtuse angle. Otherwise, while the axis of the body 60 and the extension direction of the connection portion 62 are at right angles, the body 60 and the operating rod 36 may not be parallel to each other. Alternatively, the axis of the body 60 and the extension direction of the connection portion 62 may form an acute angle or an obtuse angle, while the body 60 and the operating rod 36 are not parallel to each other. Furthermore, a body 60 provided with a curved portion or bent portion in at least a portion thereof (a configuration in which the axis cannot necessarily be specified) may also be employed.

Figure 5A:
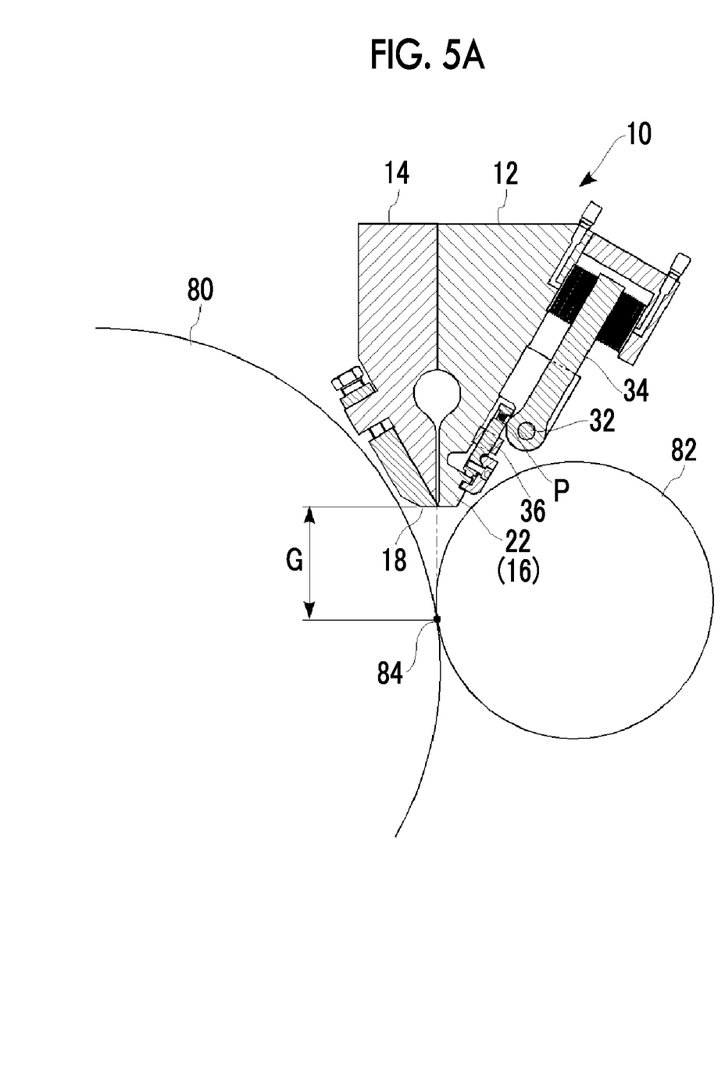
FIGS. 5A and 5B are views illustrating the arrangement and configuration of the die lip driving unit and a resin transporting mechanism.
Figure 5B:
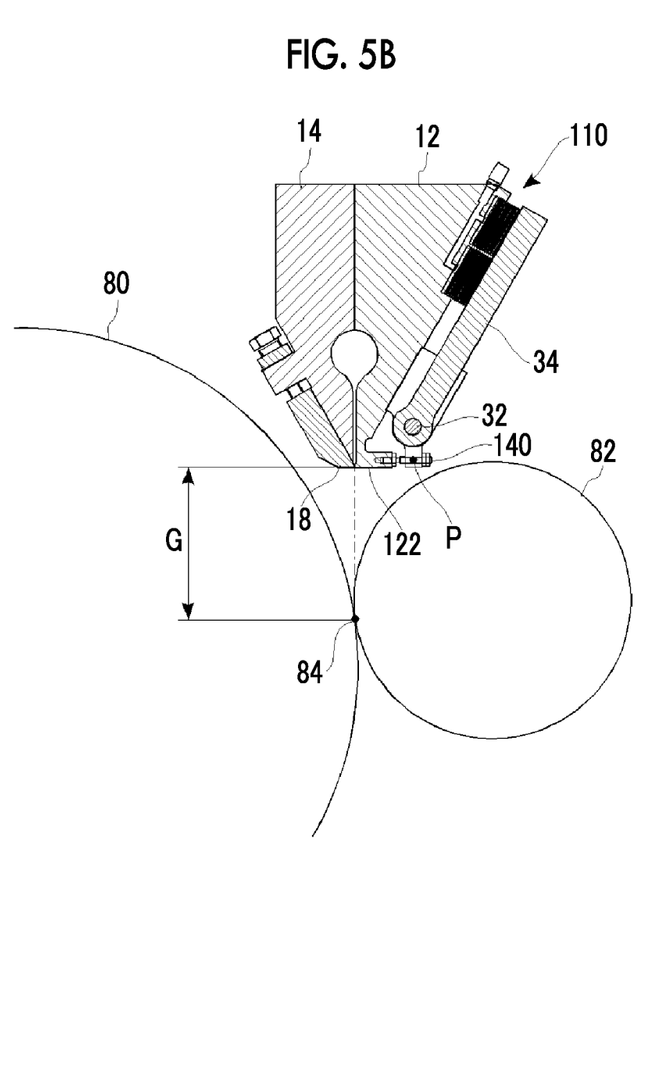

FIGS. 5A and 5B are views illustrating the arrangement and configuration of the die lip driving unit and a resin transporting mechanism. FIG. 5A illustrates a case where the die lip driving unit of this embodiment is employed, and FIG. 5B illustrates a case where a die lip driving unit according to a comparative example is employed. In the comparative example, a lever and a flexible lip portion come into contact with each other and are attached to each other without an operating rod interposed therebetween.

The T-die 10 of this embodiment is installed in the laminator and drops the molten resin extruded from the extruder (not illustrated) from the gap between the movable lip 16 (the flexible lip portion 22) and the fixed lip 18. As illustrated in FIG. 5A, the T-die 10 allows a film-like molten resin to be derived toward a nip portion 84 between a forming roll 80 and a nip roll 82 provided on the lower side thereof. A base material sheet is transported to the nip portion 84 from a separate transport path. The molten resin and the base material sheet are nipped between the nip roll 82 and the forming roll 80 and are pressed against each other, thereby forming a laminate film. The laminate film is wound around the forming roll 80 and cooled, and is thereafter guided to the downstream side in the transport direction thereof.

In this embodiment, as described above, since the operating rod 36 is disposed along the side surface of the die body 12, the rotational force of the lever 34 is converted into the force of the operating rod 36 in the axial direction thereof, and the driving force in the direction along the side surface of the die body 12 is applied to the flexible lip portion 22. In addition, the point of action of the lever 34 is positioned closer to the die body 12 side than the rotating shaft 32 is. Therefore, as illustrated in the figure, the point of action P of the lever 34 can be set to a relatively high position. In addition, the rotating shaft 32 can be disposed at a higher position distant from the flexible lip portion 22. As a result, an air gap G between the outflow port of the resin in the T-die 10 and the nip portion 84 can be reduced. This means that a shrinkage phenomenon (neck-in) that may occur at both ends of the resin film in the air gap G can be suppressed and thus losses due to trimming after the formation can be reduced, that is, the product effective width can be increased.

Contrary to this, in the comparative example illustrated in FIG. 5B, the tip end surface of a pressure-receiving portion that extends from a flexible lip portion 122 in a horizontal direction and the tip end of a transmission member 140 fixed to the lever 34 come into contact with each other. Accordingly, a configuration is employed in which the rotational force of the lever 34 is directly transmitted to the flexible lip portion 122. In addition, the point of action P of the lever 34 is set to be a position below the rotating shaft 32. As a result, the point of action of the lever 34 is at a position farther from the die body 12 than the rotating shaft 32. In this configuration, the air gap G has to be increased in order to avoid interference between the die lip driving unit and the nip roll 82. In other words, by employing the configuration and arrangement of the operating rod 36 of this embodiment illustrated in FIG. 5A, the space between the rotating shaft 32 and the nip roll 82 can be reduced as much as possible, and accordingly, the air gap G can be reduced. As a result, the yield of the resin film sent out from the T-die 10 is higher compared with that of the comparative example.

As described above, in the T-die 10 of this example, by allowing the direction of the rotational force at the point of action of the lever 34 to be coincident with the force transmission direction (axial direction) of the operating rod 36, the driving force of the actuator 24 can be efficiently transmitted to the flexible lip portion 22. In addition, by disposing the operating rod 36 along the side surface of the die body 12 in the vertical direction, the point of action of the lever 34 can be set to a high position. Accordingly, the air gap G between the resin outflow port in the die body 12 and the resin transporting mechanism (the rolls and the like) can be reduced, and thus the yield during the resin film formation can be enhanced.

Another Embodiment

Figure 6:
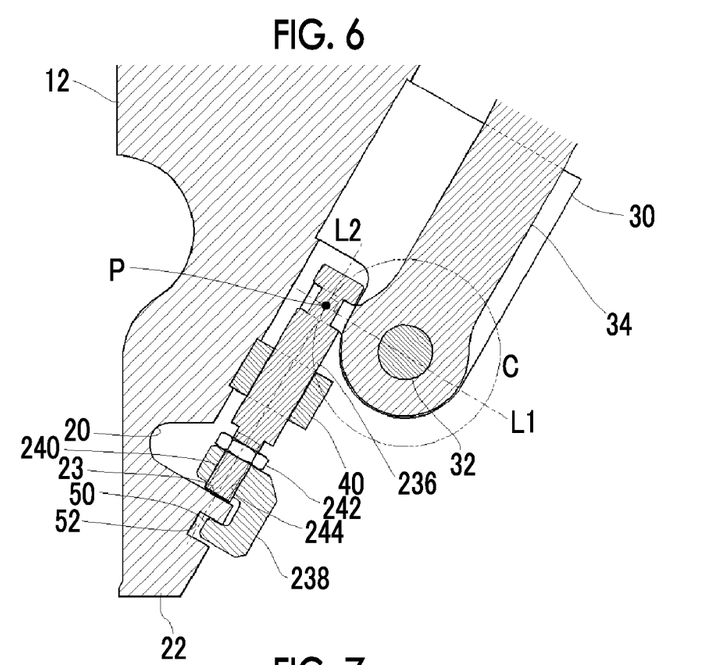
FIG. 6 is a partial enlarged sectional view illustrating the configuration of a die lip driving mechanism according to another embodiment.

Next, another embodiment of the invention will be described. A die lip driving structure according to this embodiment is the same as that of the one embodiment except for the connection structure of an operating rod and a flexible lip portion. Therefore, like constituent elements similar to those of the one embodiment are denoted by like reference numerals, and the description thereof will be omitted. FIG. 6 is a partial enlarged sectional view illustrating the configuration of a die lip driving mechanism according to the another embodiment.

In this embodiment, a male screw portion 240 is provided in the lower portion of an operating rod 236. A nut 242 is fastened to the base end portion of the male screw portion 240. A connection member 238 has a U-shaped longitudinal section, and through the upper portion thereof, a female screw portion 244 which can be fastened to the male screw portion 240 penetrates.

In this configuration, by fastening the male screw portion 240 to the female screw portion 244 to pass therethrough, the tip end surface of the operating rod 236 is pressed against the pressure-receiving surface 23 of the flexible lip portion 22, and thus the operating rod 236 and the flexible lip portion 22 are firmly fixed to each other. Here, by fastening the nut 242, the fixing of the operating rod 236 and the connection member 238 can be stabilized. At this time, a portion of the flexible lip portion 22 is nipped between the engagement portion 50 of the connection member 238 and the tip end portion of the operating rod 236, and accordingly, the operating rod 236 is connected to the flexible lip portion 22 in the axial direction thereof.

Still Another Embodiment

Figure 7:
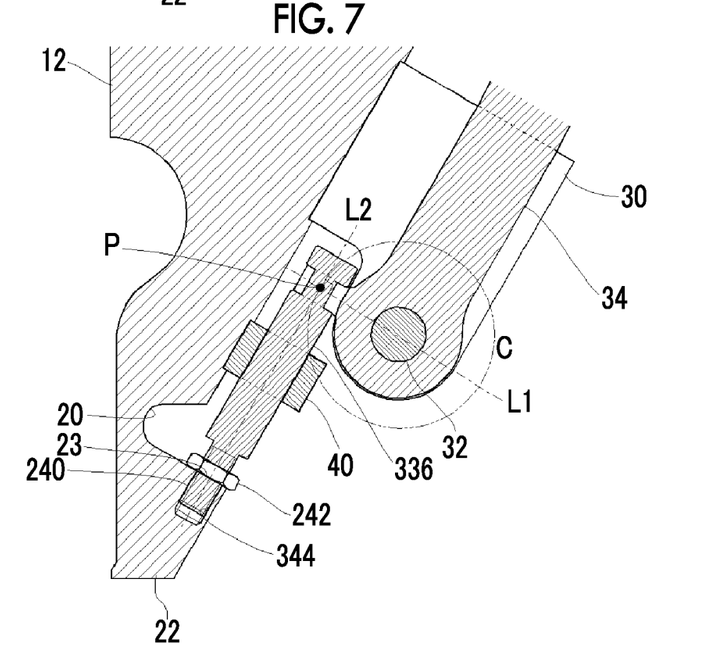
FIG. 7 is a partial enlarged sectional view illustrating the configuration of a die lip driving mechanism according to still another embodiment.

Next, still another embodiment of the invention will be described. A die lip driving structure according to this embodiment is the same as that of the another embodiment except for the connection structure of an operating rod and a flexible lip portion. Therefore, like constituent elements similar to those of the another embodiment are denoted by like reference numerals, and the description thereof will be omitted. FIG. 7 is a partial enlarged sectional view illustrating the configuration of a die lip driving mechanism according to the still another embodiment.

In this embodiment, as in the another embodiment, the male screw portion 240 is provided in the lower portion of an operating rod 336, and the nut 242 is fastened to the base end portion of the male screw portion 240. A female screw portion 344 is provided in the pressure-receiving surface 23 of the flexible lip portion 22 and is configured so that the male screw portion 240 is screwed thereto in the axial direction.

In this configuration, by screwing the male screw portion 240 to the female screw portion 344, the operating rod 336 and the flexible lip portion 22 can be directly connected to each other. Here, by fastening the nut 242, the operating rod 336 and the flexible lip portion 22 can be firmly fixed to each other. At this time, by adjusting the amount of the male screw portion 240 screwed to the female screw portion 344, the positional relationship between the operating rod 336 and the lever 34 can be set with high precision. That is, the direction of the rotational force of the lever 34 at the point of action P can be allowed to be coincident with the axial direction of the operating rod 336.

Further Another Embodiment

Figure 8:
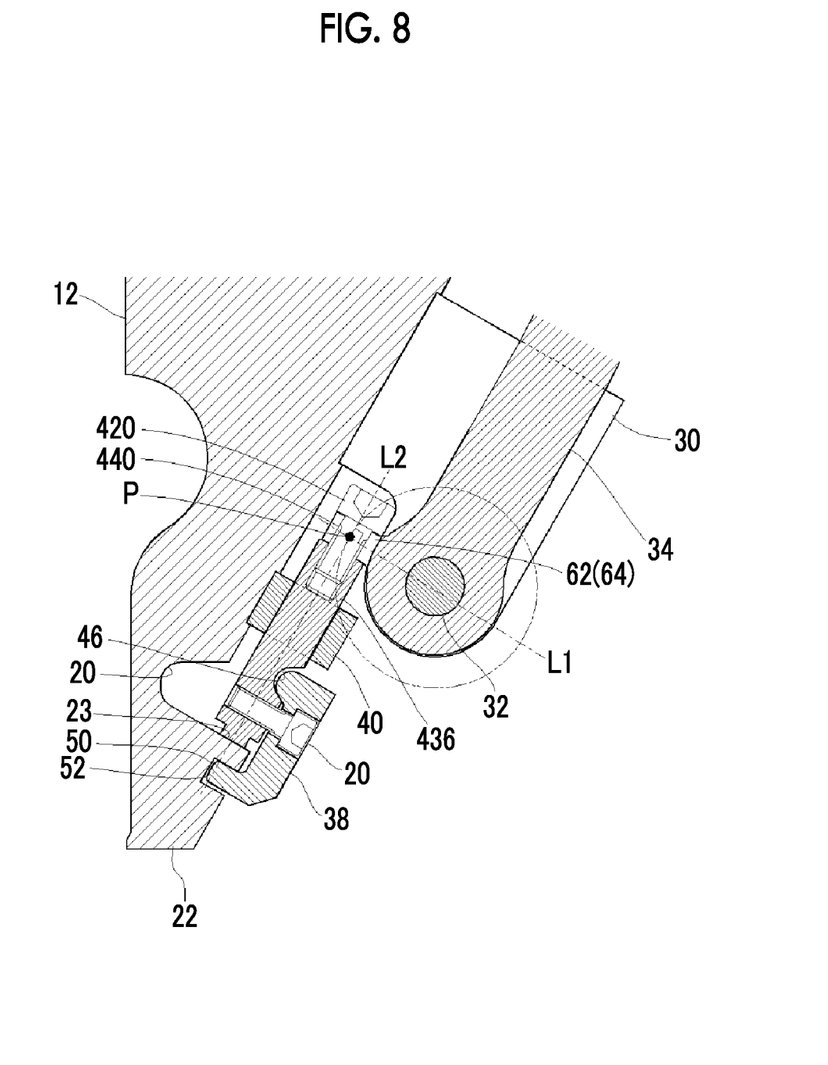
FIG. 8 is a partial enlarged sectional view illustrating the configuration of a die lip driving mechanism according to further another embodiment.

Next, further another embodiment of the invention will be described. A die lip driving structure according to this embodiment is the same as that of the one embodiment except for the connection structure of an operating rod and a lever. FIG. 8 is a partial enlarged sectional view illustrating the configuration of a die lip driving mechanism according to the further another embodiment.

In this embodiment, by assembling a screw 420 to the upper end portion of an operating rod 436 in the axial direction thereof, a narrowed portion 444 is formed between the upper end of the operating rod 436 and the head portion of the screw 420. In addition, the connection portion 62 of the lever 34 is assembled to the narrowed portion 444. In this configuration, a process for forming a narrowed portion 44 on the outer peripheral surface of the operating rod 36 as in the one embodiment becomes unnecessary. Since the narrowed portion 444 is a point that forms the point of action P and thus requires high precision, manufacturing cost can be reduced by omitting a cutting process and the like. In addition, for example, by increasing the fastening strength of the screw 420, it is possible to strongly connect the operating rod 436 and the lever 34 to each other.

Yet Another Embodiment

Figure 9A:
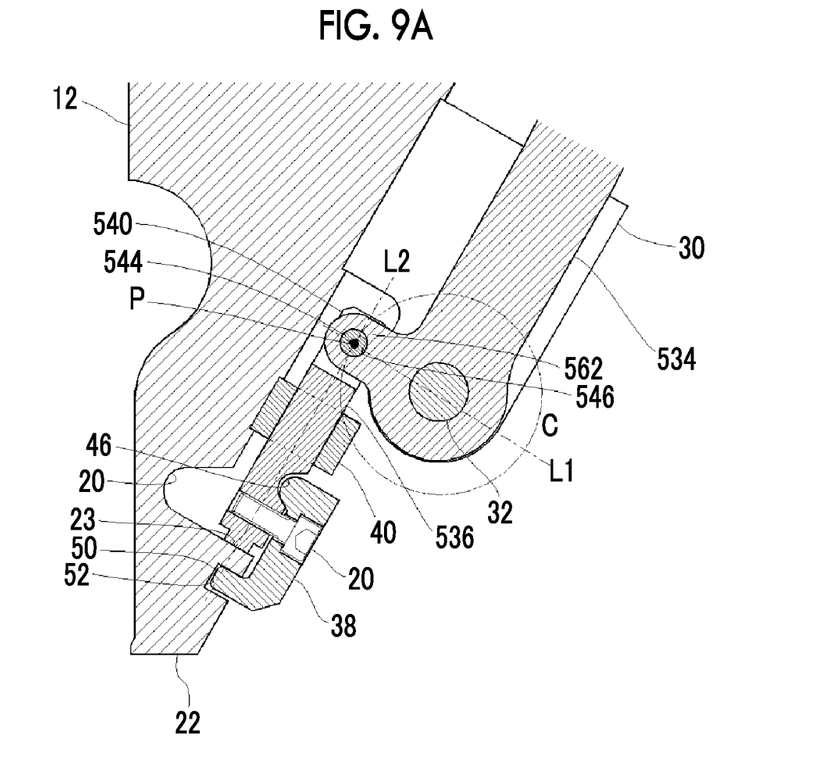
FIGS. 9A and 9B are views illustrating the configuration of a die lip driving mechanism according to yet another embodiment.
Figure 9B:
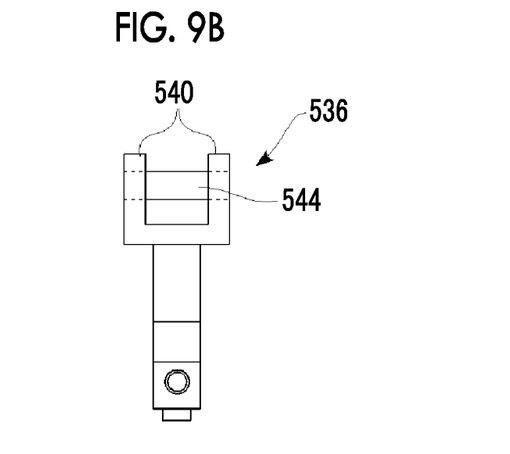

Next, yet another embodiment of the invention will be described. A die lip driving structure according to this embodiment is the same as that of the one embodiment except for the connection structure of an operating rod and a lever. FIGS. 9A and 9B are views illustrating the configuration of a die lip driving mechanism according to the yet another embodiment. FIG. 9A is a partial enlarged sectional view illustrating the connection portion of the operating rod and the lever and the peripheral structure thereof, and FIG. 9B is a front view of the operating rod.

In this embodiment, a fork-shaped arm portion 540 is provided in the upper end portion of an operating rod 536, and a rotating shaft 544 is provided to cross the arm portion 540. A connection portion 562 of the lever 534 does not have a fork-shape unlike the one embodiment and extends in a flange shape, and the center portion thereof is provided with through-holes 546 through which the rotating shaft 544 is inserted. The connection portion 562 is rotatably connected to the rotating shaft 544. In this configuration, the position of the rotating shaft 544 becomes the point of action of the lever 534. The lever 534 can be relatively rotated about the connection portion of the lever 534 and the operating rod 536, and thus there is an advantage that an excessive load exerted on the point of action P when the operating rod 536 is relatively largely displaced can be prevented.

The embodiments of the invention have been described above on the basis of the embodiments. The embodiments are only examples, and it should be understood by those skilled in the art that various modification examples of the combination of constituent elements and processes can be made and the modification examples are also included in the scope of the invention.

Modification Example 1

In the embodiments, the configuration in which both a tensile load and a pressing load can be applied to the flexible lip portion by operating the lever and the operating rod by driving the actuator is employed. That is, the flexible lip portion can be expanded or can be narrowed from a neutral state of the die lip driving unit. In a modification example, a configuration in which only one of a tensile load and a pressing load can be applied to the flexible lip portion is employed such that only one of the expanding operation and the narrowing operation of the flexible lip portion can be performed. For example, one end side of the operating rod 36 may be connected to apply a biasing force (driving force) in only one of a pressing direction and a pulling direction to the flexible lip portion 22. In this case, when the biasing force applied via the operating rod 36 is released, the flexible lip portion 22 may be allowed to return to a state before the biasing force is applied, due to the elasticity thereof.

Modification Example 2

In the embodiments, the pneumatic drive type actuator 24 is employed, and the configuration in which when compressed air is supplied to one of the bellows 70 and 72, the other is opened to the air is exemplified. In a modification example, a configuration in which compressed air is supplied to both the bellows 70 and 72 and generates a pressure difference therebetween such that a tensile load or a pressing load is applied to the flexible lip portion may be employed. For example, a pressure difference may be generated by providing individual pressure regulating valves in the bellows 70 and 72.

Modification Example 3

In the embodiments, the configuration in which the bellows 70 for pulling and the bellows 72 for pressing are respectively provided on both sides of the single lever is exemplified. In a modification example, a configuration in which a single bellows is provided to only one side of a single lever and the lever is operated in a pulling direction or a pressing direction by increasing or reducing the pressure of the bellows may be employed.

Modification Example 4

In the embodiments, the pneumatic drive type actuator 24 is employed. However, a water pressure or oil pressure drive type actuator may also be employed. In addition, a circular type bellows is exemplified. However, a rectangular shape or other shapes may also be employed. Furthermore, a motor drive type actuator or other types of actuators may also be employed. Otherwise, the lever may also be manually operated without providing an actuator.

Modification Example 5

In the embodiments, the above-described die lip driving structure is applied to a laminator die, but may also be applied to dies for other applications including a film forming die and a sheet forming die, for example, a coater die, and a solvent casting die.

Modification Example 6

In the embodiments, the die lip driving structure is applied to the T-die, but may also be applied to a circular die for a blown film.

Modification Example 7

In the embodiments, for example, as illustrated in FIG. 2, the configuration in which the operating rod 36 is supported by the bearing member 40 is illustrated. However, in a case where the tip end of the operating rod 36 is firmly connected to the flexible lip portion 22, the operating rod 36 can be supported to be displaced in the axial direction by the die body 12 via the flexible lip portion 22 even when the bearing member 40 is not provided. Therefore, in this case, the bearing member 40 may be omitted. The bearing member 40 may also be applied in the same manner in other embodiments.

It should be understood that the invention is not limited to the above-described embodiment, and may be modified into various forms on the basis of the spirit of the invention. Additionally, the modifications are included in the scope of the invention.

What is claimed is:

1. A die lip driving structure for adjusting a gap between a first lip and a second lip by applying a pressing load or a tensile load to a flexible lip portion which forms at least one of the first lip and the second lip provided in a die body, the die lip driving structure comprising:
   driving mechanisms provided along a width direction of the die body: and actuators that drive the driving mechanisms, each of the driving mechanisms including:

a lever supported by a rotating shaft as a fulcrum, a position of the rotating shaft with respect to the die body being fixed; and an operating rod that is supported to be displaced in an axial direction of the operating rod by the die body and is supported by a point of action of the lever, wherein:

a rotational force of the lever is converted into a force in the axial direction, and the force in the axial direction becomes a pressing load or a tensile load exerted on the flexible lip portion, the lever directly applies a force to the operating rod at the point of action of the lever, the point of action of the lever is positioned closer to the die body than the rotating shaft, and the lever comprises a body of which one end portion is rotatably supported by the rotating shaft, and a connection portion provided to extend from the one end portion of the body toward the die body in a direction perpendicular to the width direction to be connected to the operating rod.

2. The die lip driving structure according to claim 1, wherein, in a neutral state in which no load is applied to the flexible lip portion, a straight line which connects the point of action of the lever to the rotating shaft is perpendicular to an axis of the operating rod such that a direction of the rotational force of the lever at the point of action is coincident with the axial direction of the operating rod.

3. The die lip driving structure according to claim 1, further comprising:

a connection member that connects the operating rod to the flexible lip portion, wherein relative positions of the operating rod and the flexible lip portion are adjusted by the connection member.

4. The die lip driving structure according to claim 1, wherein the body of the lever including a point of application of the lever is configured to be substantially parallel to the operating rod.

5. The die lip driving structure according to claim 1, wherein the operating rod is disposed to be substantially parallel to a side surface of the die body.

6. The die lip driving structure according to claim 1, wherein each of the actuators is provided in a side portion of the die body and drives a respective end portion of one of the levers on the opposite side of the rotating shaft on the basis of a driving signal output to adjust the gap between the first lip and the second lip.

* * * * *